(12) United States Patent
Katsumura

(10) Patent No.: US 7,900,341 B2
(45) Date of Patent: Mar. 8, 2011

(54) METHOD OF MANUFACTURING HARD DISK RECORDING DEVICE USING PATTERNED MEDIUM

(75) Inventor: Yoshiteru Katsumura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 12/361,957

(22) Filed: Jan. 29, 2009

(65) Prior Publication Data

US 2009/0217510 A1    Sep. 3, 2009

(30) Foreign Application Priority Data

Feb. 29, 2008    (JP) .................................. 2008-048961

(51) Int. Cl.
G11B 5/127 (2006.01)
H04R 31/00 (2006.01)

(52) U.S. Cl. ................ 29/603.03; 29/603.04; 29/603.06; 29/603.07; 29/603.01; 219/68; 219/70; 228/175; 228/180.22; 228/219; 360/244.2; 360/244.8; 360/245.9; 427/127; 427/128

(58) Field of Classification Search ............... 29/603.01, 29/603.03, 603.04, 603.06, 603.07; 228/175, 228/180.22, 219; 360/240, 244, 244.2, 244.8, 360/245.9; 427/127, 128
See application file for complete search history.

(56) References Cited

U.S. PATENT DOCUMENTS

| 6,522,494 B1 * | 2/2003 | Magee ........................... 360/75 |
| 6,724,558 B2 * | 4/2004 | Bryant et al. ................... 360/75 |
| 2004/0257691 A1 * | 12/2004 | Fan et al. ........................ 360/75 |

FOREIGN PATENT DOCUMENTS

| JP | 03-022211 | 1/1991 |
| JP | 05-342527 | 12/1993 |
| JP | 2001-110050 | 4/2001 |
| JP | 2002-170348 | 6/2002 |
| WO | WO 03/019540 A1 | 3/2003 |

* cited by examiner

*Primary Examiner* — Paul D Kim
(74) *Attorney, Agent, or Firm* — Antonelli, Terry, Stout & Kraus, LLP.

(57) ABSTRACT

A high yield in a manufacture of an HDD having a high recording density and using a patterned medium by a trench-like or a dot-like pattern is realized. In this HDD manufacturing method, a magnetic field size (writing and reading) of a head in a head manufacturing process is measured in a head unit inspection process. According to the result of the measurement, the head is classified into a plurality of groups in a head classifying process. In a patterned medium manufacturing process, a plurality of types of the patterned media which are designed so as to correspond to the classified head groups are manufactured. In an HDD assembly process, the HDD is manufactured by combining the plurality of head groups and the plurality of patterned media following a predetermined rule.

9 Claims, 8 Drawing Sheets

METHOD OF MANUFACTURING HARD DISK RECORDING DEVICE USING PATTERNED MEDIUM

CROSS-REFERENCE TO RELATED APPLICATION

The present application claims priority from Japanese Patent Application No. JP 2008-048961 filed on Feb. 29, 2008, the content of which is hereby incorporated by reference into this application.

TECHNICAL FIELD OF THE INVENTION

The present invention relates to a recording and reproducing device (referred to as a hard disk recording device, a hard disk drive (HDD), and the like) including a disk-like magnetic recording medium (magnetic disk). More particularly, the present invention relates to a product design of a device using a magnetic disk (referred to as a patterned medium) in which a pattern of a shape such as trench and dot (point) is formed in advance, and a method of manufacturing the same.

BACKGROUND OF THE INVENTION

In conventional (current) HDDs, a magnetic signal is recorded by using a magnetic head (recording head) on a disk-like magnetic recording medium (continuous medium which is deposited with a magnetic material) on which a magnetic thin film made of fine crystal grains is formed. However, it is anticipated in the future that the crystal grain size will become smaller than 5 nm at the stage when recording density of HDDs will exceeds 1 terabit per 1 square inch (1 Tbit/inch$^2$) by high integration, and it will make signal holding difficult due to thermal fluctuation.

As a countermeasure for that, in place of the conventional (current) medium (referred to as a non-patterned medium for discrimination), a technique for a patterned medium as disclosed in Japanese Patent Application Laid-Open Publication No. H03-22211 (Patent Document 1) is concerned. In a recording method using the patterned medium, a pattern having a track by a shape such as trench or dot is formed on the medium, and recording is performed on its separated magnetic material (recording unit). In this manner, the countermeasure is taken to reduction of reliability and noise from adjacent bits due to the thermal fluctuation mentioned above.

In a method of manufacturing this patterned medium, there are a method of partial non-magnetization with using a mask disclosed in International Publication No. WO03/019540 (Patent Document 2), a method of combining photolithography and etching disclosed in Japanese Patent Application Laid-Open Publication No. 2001-110050 (Patent Document 3), and others.

On the other hand, currently, in a magnetic recording method used for general HDDs, the magnetic material on the medium is subjected to magnetization reversal by a magnetic field (recording magnetic field) which is generated by the head (recording head), thereby performing signal recording. Therefore, the magnetic recording method has a feature that a physical size of a recording region (recording unit) corresponding to a recordable bit signal is determined by a magnetic field size of the head.

To realize a high recording density, a recording head having a magnetic field size corresponding to the recording density is required. That is, as an accuracy of the head, a recording magnetic field size is required to be properly small. Further, not only for the recording head, but also for a reproducing head for reading (reproducing) information which is recorded (written) on the medium, the same accuracy (that is, the reading magnetic field size being properly small) is required.

Note that, as for the head, generally, it is often a type (recording and reproducing head) of a single head to which both of a recording head function (writing element) and a reproducing head function (reading element) are provided. Of course, it is also possible to apply a configuration having different heads for writing and reading.

According to the foregoing, for example, as represented by a technique disclosed in Japanese Patent Application Laid-Open Publication No. H05-342527 (Patent Document 4), as a new structure of the recording and reproducing head, a technique example which makes the magnetic field size of the head small is proposed.

Further, in Japanese Patent Application Laid-Open Publication No. 2002-170348 (Patent Document 5), as a magnetic recording and reproducing method and a recording pattern formation method, a technique is disclosed in which, necessary parameters with respect to a plurality of track densities are recorded in advance, and then, the track density is set according to characteristics of a recording and reproducing head and a recording medium which have been measured after device assembly.

SUMMARY OF THE INVENTION

As described above, in the HDDs using the patterned medium, the recording density (particularly, high recording density) is determined by the magnetic field size of the head (recording magnetic field size and reading magnetic field size), and the pattern (the recording unit) size of the patterned medium.

Further, in the patterned medium, as shown in Patent Document 1, a coordinate for recording signals is determined by the pattern in advance. To realize a high recording density on its patterned medium, position control with high accuracy of the head is required for reading and writing on the coordinate (the recording unit).

No method, product structure, and so forth have been proposed to realize a high recording density of the HDD, a high yield mass production (efficient manufacture at a low cost), and the like by appropriately defining a relation and the like between the head magnetic field size and the pattern size relating to the recording density.

As for a manufacturing yield of the HDD using the patterned medium, particularly, parts such as the head can not satisfy a specification (accuracy) required in HDD products due to a manufacturing variation, and it causes the parts to be not usable (mountable) in the product. Consequently, a usage rate of the parts such as the head is decreased, thereby causing an increase of manufacturing cost of the HDD products and lowering of manufacturing efficiency.

As a main problem relating to the manufacture of the HDD using the patterned medium, it is difficult to realize both of a high recording density and a high yield mass production (the efficient manufacture at a low cost) as long as using the same concept with the method of manufacturing the HDD using the conventional disk (non-patterned medium), and a manufacturing efficiency is low. The reason for this is, as described above, factors and relations such as the magnetic field of the head, the pattern (recording unit), the position control, the manufacturing variation, and the usage rate of parts, have not been studied as much.

The present invention has been made in view of problems described above. And, a main object of the present invention relates to a manufacture of an HDD using a patterned medium, and is to provide a technique capable of solving the problems described above. That is, the main object is to provide a technique capable of realizing a high recording density of the HDD and a high yield manufacture, and particularly, a technique capable of realizing an improvement or a significant increase of a usage rate of a head part.

The typical ones of the inventions disclosed in this application will be briefly described as follows. To achieve the above-described object, a typical embodiment of the present invention is a technique such as a method of manufacturing an HDD (hard disk recording device) using a patterned medium, and has a feature of having a configuration described below.

In the present manufacturing method, a manufacturing process of a head includes a process of measuring and inspecting a magnetic field size of the manufactured head, that is, a magnetic field (recording magnetic field) size of a recording head (writing element) and a magnetic field (reproducing magnetic field) size of a reproducing head (reading element). And, according to a distribution of variation of the head magnetic field size which is a result of the measurement and inspection, the manufacturing process of the head includes a process of classifying the head into a plurality (N) of groups. On the other hand, a manufacturing process of a patterned medium includes a step such that the patterned medium is designed according to the head magnetic field size to manufacture a plurality (M) of types of the patterned media which have different characteristics. And, by combining the plurality (N) of head groups and the plurality (M) of patterned media with following a predetermined rule, the HDD device is assembled and manufactured. In the above-described manner, the variation of the head manufacture is solved by a stepwise design of the pattered medium, so that the usage rate of parts is improved to realize the high yield manufacture.

The present manufacturing method includes, for example, a first step (manufacturing process of the patterned medium) for manufacturing (or preparing) the patterned medium, a second process (manufacturing process of the head) of manufacturing (or preparing) the head (head unit), and a third step (assembly process of the HDD device) of assembling the HDD including the patterned medium made by the first step and the head made by the second step. The first process includes a process of forming a plurality (M) of types of patterned media, which are designed according to a specification of the head and are different in a density (a recording density and the like) of a formation of a pattern serving as a recording unit. The second process includes a process of working and forming the head, a process of measuring a magnetic field size of the head, and a process of classifying the head into a plurality (N) of the groups according to a distribution of a variation of the magnetic field size of the head. In the third process, the plurality (N) of the groups and the plurality (M) of types of the patterned media are combined to follow a predetermined rule, so that a plurality of HDDs, in which correspondence between the patterned media and the head is different, is assembled. In the classification process and others, the number (N) of groups of the heads is larger than the number (M) of types of the patterned media (M<N). In this manner, the usage rate of parts is improved.

Further, in the above-described manufacturing method, as the predetermined rule, at least one partial group among the plurality (N) of groups is corresponded to two or more types of the patterned media among the plurality (M) of types of the patterned media to be redundantly used. By an overlapped use (a design capable of appropriately selecting), the usage rate of parts is improved.

The effects obtained by typical aspects of the present invention will be briefly described below. According to a typical embodiment of the present invention, relating to the manufacture of the HDD using the patterned medium, it is possible to realize a high recording density and a high yield manufacture of the HDD. Particularly, an improvement or a significant increase of the usage rate of the head part can be realized.

BRIEF DESCRIPTIONS OF THE DRAWINGS

Figure 7A:
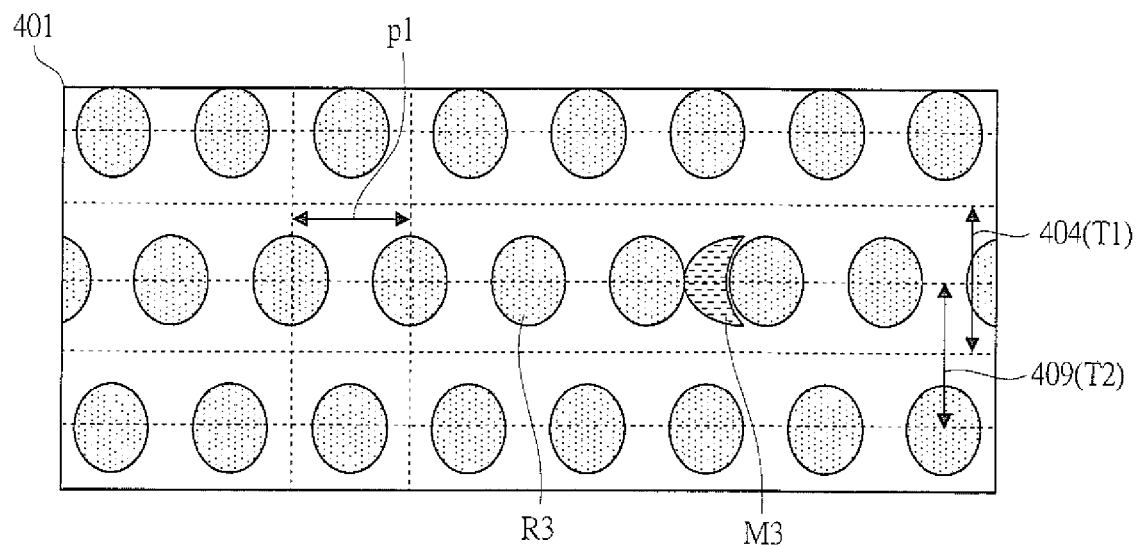
Figure 7B:
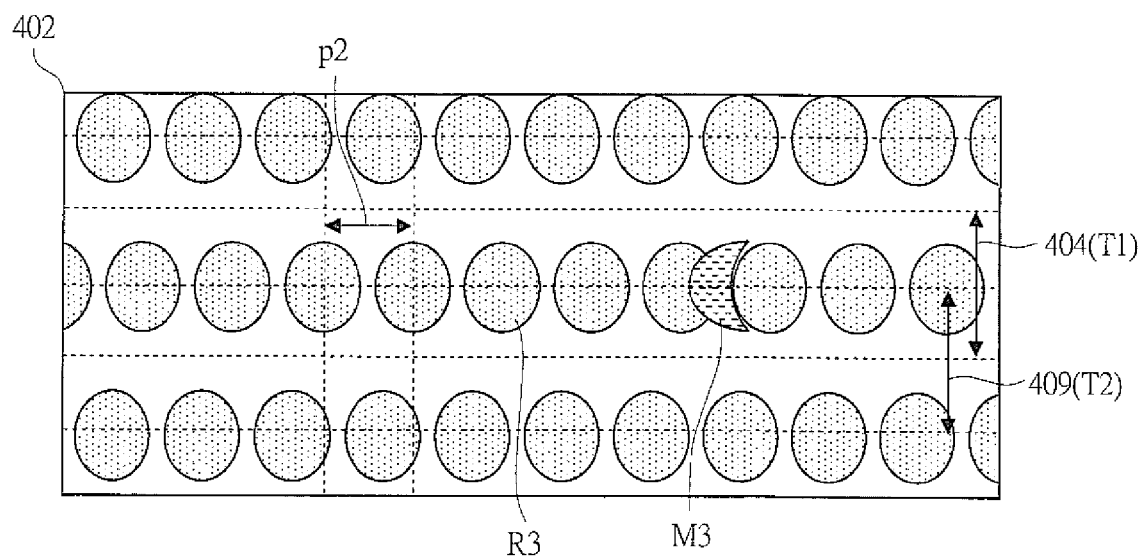
Figure 8A:
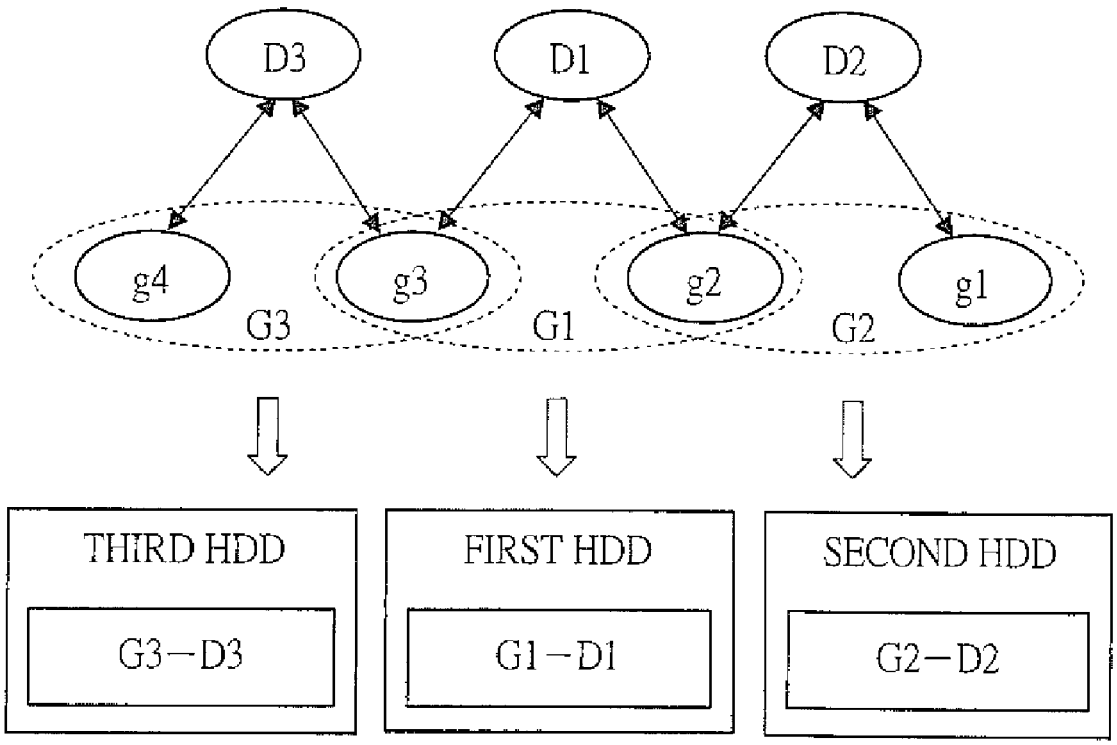
Figure 8B:
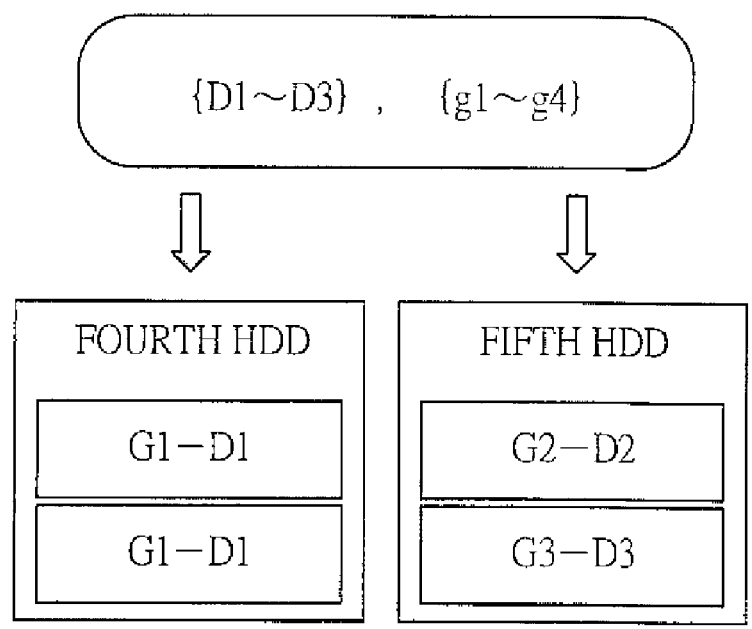

FIG. 7A is a diagram showing an enlargement of a part of a patterned medium (in a case of a dot-like pattern) in a method of manufacturing an HDD according to a third embodiment of the present invention, and showing a pattern of a first example, and FIG. 7B is a diagram showing an enlargement of a part of the patterned medium (in the case of the dot-like pattern) in the method of manufacturing an HDD according to the third embodiment of the present invention, and showing a pattern of a second example;

FIG. 8A is a diagram showing a rule of combination in a method of manufacturing an HDD according to an embodiment of the present invention in a briefly summarized manner, and showing a configuration for manufacturing a plurality of HDDs by a combination of a plurality (M) of types of patterned media and a plurality (N) of head groups; and FIG. 8B is a diagram showing a rule of combination in the method of manufacturing an HDD according to the embodiment of the present invention in a briefly summarized manner, and further showing a combination example in a case where a plurality (P) of patterned media and a plurality (Q) of heads are embedded in a single HDD device.

DESCRIPTIONS OF THE PREFERRED EMBODIMENTS

Hereinafter, embodiments of the present invention will be described in detail with reference to the accompanying drawings. Note that, components having the same function are denoted by the same reference symbols throughout the drawings for describing the embodiment, and the repetitive description thereof will be omitted.

<Premise>

Figure 1:
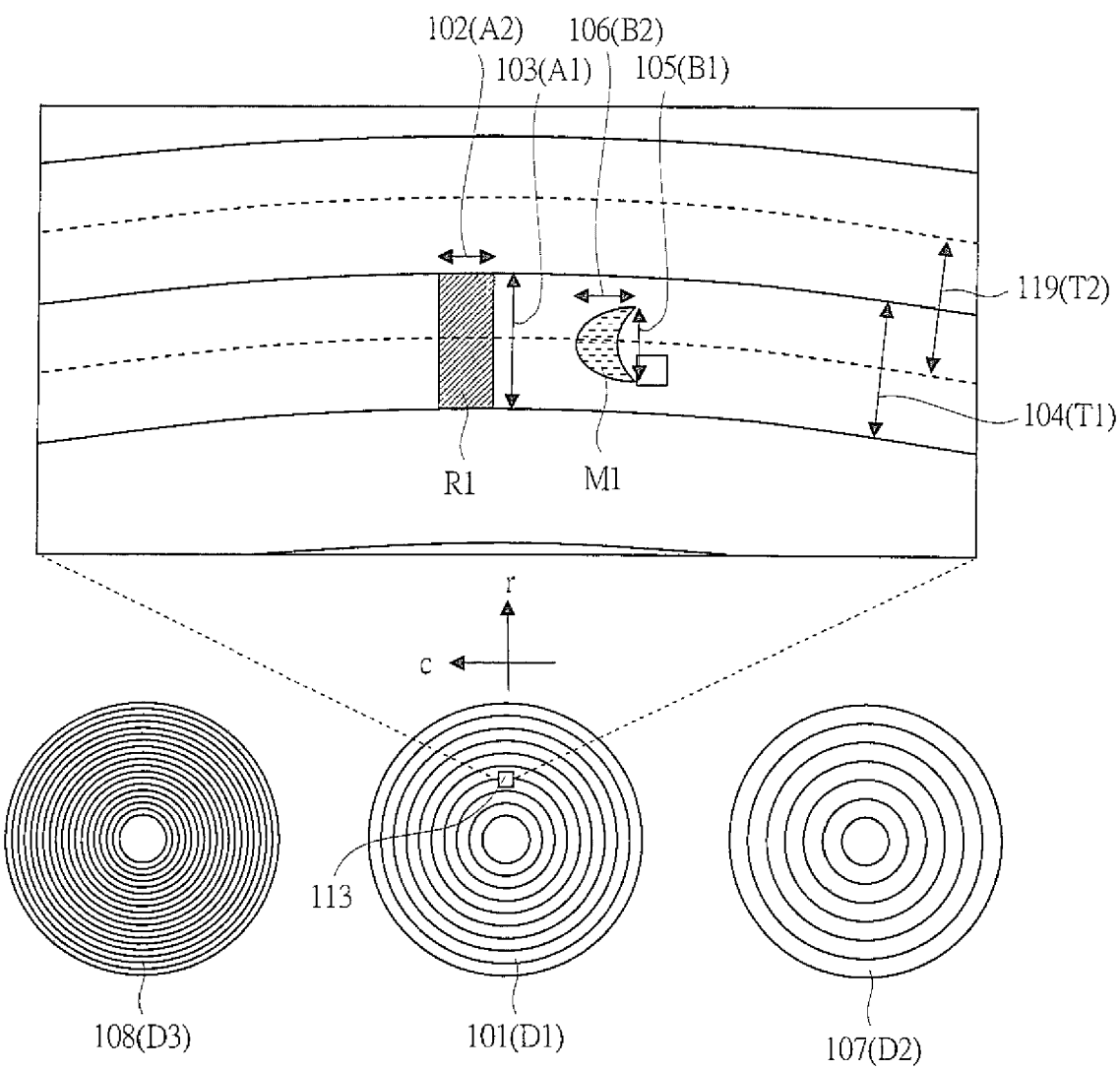
FIG. 1 is a diagram for describing a conventional technique serving as a premise of the present invention, and a method of manufacturing an HDD according to an embodiment of the present invention, and showing a plurality of patterned media and an enlargement of a part of a patterned medium (in a case of a trench-like pattern)
Figure 2:
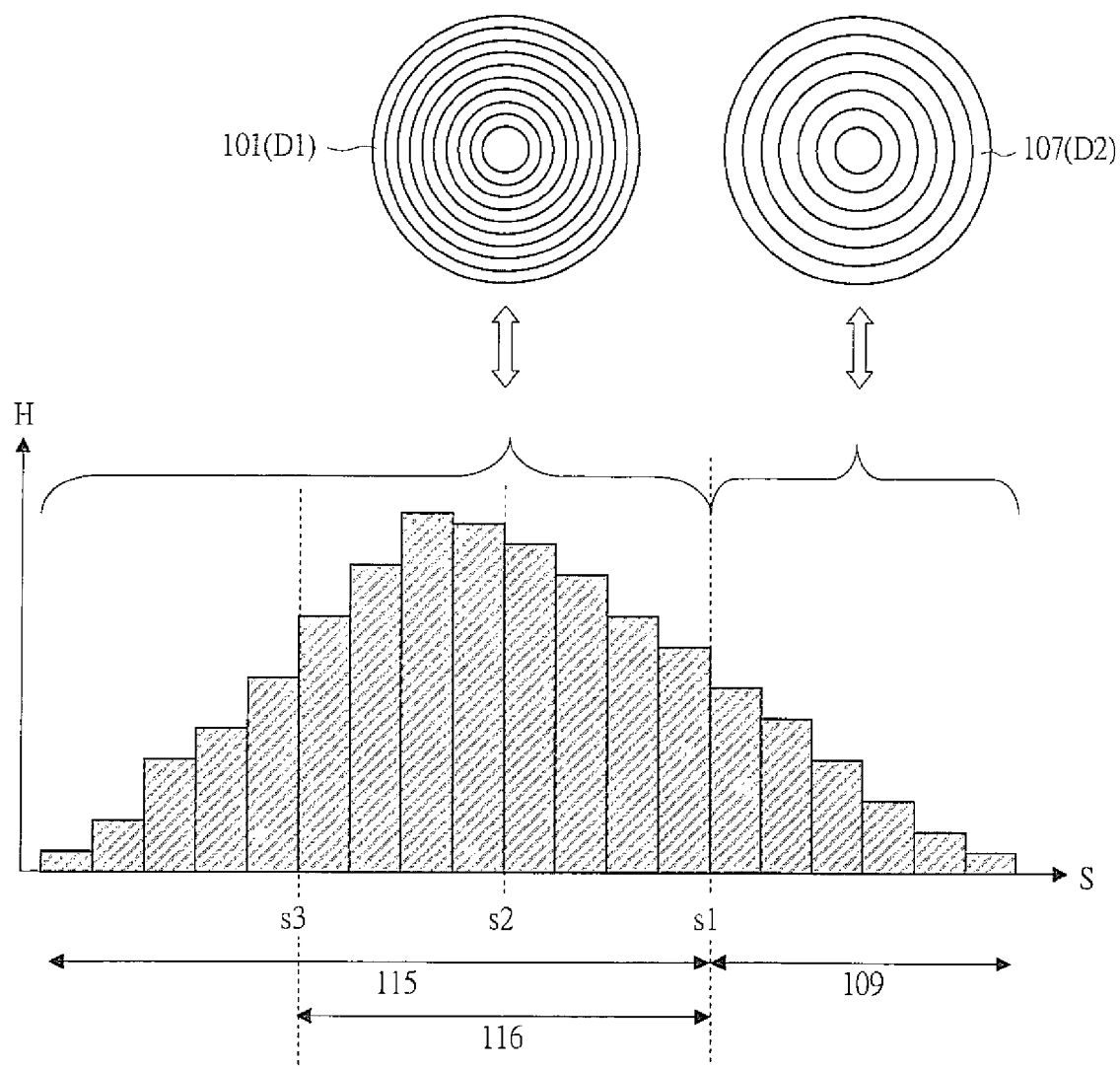
FIG. 2 is a diagram for describing a conventional technique serving as an assumption of the present invention and a method of manufacturing an HDD according to an embodiment of the present invention, and showing a distribution (histogram) of a variation of a magnetic field size in a manufacture of a head, and an example of a correspondence (combination) between a head group and a patterned medium.

First, with reference to FIGS. 1 and 2, a conventional technique serving as a premise of the present invention will be described. This conventional technique is a method of manufacturing an HDD using a patterned medium based on a concept of a method of manufacturing an HDD using a conventional non-patterned medium. An example of FIG. 1 shows, on an upper side, a plurality of types of disks (patterned media) having different track widths, recording densities (capacities), and the like. An upper side of FIG. 1 shows an enlargement of a part 113 of a patterned medium 101 serving as a reference. A radial direction of the disk is shown by "r", and a circumferential direction (rotational direction) is shown by "c". An example of FIG. 2 shows, on a lower side, a distribution (histogram) of a variation of a magnetic field size in a manufacture of a head. "S" denotes a head magnetic field size, and "H" denotes a frequency. An upper side of FIG. 2 shows a correspondence between the head and the disk described later.

As shown in FIG. 1, considered is the case where a high recording density and the like are desired in the patterned medium 101 which is a magnetic disk having a track of a trench-like pattern and an HDD including the magnetic disk. The first patterned medium (D1) 101 has a track width etc. in a middle level as a reference. In a second patterned medium (D2) 107, the track width and the like are larger than that of the first patterned medium (D1) 101, and the recording density is smaller than that of the first patterned medium (D1) 101. In a third patterned medium (D3) 108, the track width and the like are smaller than that of the first patterned medium (D1) 101, and the recording density is larger than that of the first patterned medium (D1) 101.

In the part 113 of the first patterned medium (D1) 101, the track (unit of concentric circle) has a track width size (T1) 104 and a track interval size (T2) 119 in the radial direction r. On the track, a region (denoted by R1) of a recording unit in which a magnetic signal is recorded is provided. The region R1 has a size (A1) 103 in the radial direction r and a size (A2) 102 in the circumferential direction c. Further, the magnetic field (denoted by M1) of the recording head has a size (B1) 105 in a major axis direction (radial direction r), and a size (B2) 106 in a minor axis direction (circumferential direction c). As position control of the head, a position control in the radial direction r relates to a position shift of the magnetic field M1 in the radial direction r.

As a reference of the high recording density, the case is considered such that a recording of 1 Tbit/inch$^2$ is performed where a ratio of the size (A2) 102 and the size (A1) 103 of the region R1 is 1 to 2.5. In this case, the track width size (T1) 104 in the radial direction r becomes, for example, 40 nm. Further, the size (B1) 105 in the major axis direction of the magnetic field M1 becomes, for example, 20 nm. In that case, a specification (accuracy) (denoted by Y) required in the head position control (in the radial direction r) basically becomes ±10 nm (20 nm) by subtracting 20 nm of the size (B1) 105 in the major axis direction of the magnetic field M1 from 40 nm of the track width size (T1) 104. The position shift up to ±10 nm is allowable.

However, in the conventional (current) manufacturing method, since the head is manufactured by a thin film process having about 500 steps, the actually-formed head magnetic field sizes (B1 and B2) have a manufacturing variation. This has, for example, a distribution as shown in FIG. 2. In a conventional working accuracy, a variation of about ±20% occurs in the magnetic field size. For example, when the size (B1) 105 in the major axial direction of the magnetic field M1 is manufactured by taking aim at 20 nm, as ±20% thereof, a variation (denoted by X) of ±4 nm (8 nm) occurs.

As a result, the specification (accuracy) required by the head position control is modified and becomes ±6 nm (12 nm) (denoted by Y') (40 nm (T1)−20 nm (B1)−8 nm (X)=12 nm (Y')).

The head (and an HDD including that) which is unable to satisfy this condition (Y': ±6 nm) can not be used as a defect of interference (over-writing, over-reading, and the like) to an adjacent track might occur, and it accordingly decreases a yield of the manufacture.

As described above, in the HDD to improve the recording density by using the patterned medium, highly-accurate head position control and head magnetic field size are required such as 12 nm or less.

However, in an actual head manufacture, there are problems due to changes in a status of the manufacturing process such as shifts of an aimed value of the size and electromagnetic characteristics, and a variation fluctuation. Further, as for the head position control, there are problems such as a change of a head floating amount, an installation error of parts, and a servo control error. Therefore, it is difficult to realize the highly-accurate control and size as described above.

Note that, the problem of accuracy becomes more remarkable as a required recording density is raised. In the configuration of the above-described example in the case where the recording density is 1 Tbit/inch$^2$, to realize, for example, 2 Tbit/inch$^2$ twice as large, the size (A1) 103 in the radial direction r becomes, for example, 28 nm, and the accuracy of the head position control of ±3 nm that is about half of the case of 1 Tbit/inch$^2$ is required.

The above-described premise will be complemented as follows. For the HDD provided with a conventional disk (non-patterned medium), writing and reading and the like are controlled in accordance with a reference of not the disk side but the head side. Depending on characteristics of the head, a position of the signal (recording region) to be written on the disk is different.

On the other hand, for the HDD provided with the novel disk (patterned medium), a design of the disk side first exists instead of the head side, so that writing and reading and the like are controlled in accordance with a reference (absolute coordinate by the pattern) of the disk side.

As described above, in the method of manufacturing the HDD using the patterned medium, the design and the like of the disk and the head are made in an opposite form to the conventional one. However, conventionally, factors and relations such as the head magnetic field, the pattern (recording unit), the position control, the manufacturing variation, and the usage rate of parts are have not been studied as much. Therefore, in the method of manufacturing the HDD using the patterned medium, as long as using the same concept with the conventional HDD manufacturing method, it is difficult to realize both the high recording density and the high yield mass production.

First Embodiment

Based on the foregoing premise, by using FIGS. 1 to 5, according to a first embodiment of the present invention, a method of manufacturing an HDD (patterned medium recording device) using a patterned medium will be described. Note that, similarly to the description of the premise, the present embodiment will be described with commonly using the examples of FIGS. 1 and 2. Further, while a recording (writing) function will be mainly described, the same concept therewith can be also applied to a reproducing (reading) function.

A feature of the first embodiment lies in the case of manufacturing an HDD by combining a plurality of (for example, three) different kinds of the patterned media according to trench-like patterns and a plurality of head groups according to measurements and classifications of a variation of the head magnetic field size by a predetermined rule that satisfies conditions of recording density and usage rate of head parts.

<1-1: First Patterned Medium>

Same with the description above, in the enlargement of the part 113 of the first patterned medium (D1) 101 by the trench-like pattern of FIG. 1, the track has the track width size (T1) 104 (width of a single track), and the track interval size (T2) 119 (interval with an adjacent track) in the radial direction r. Note that, a broken line in FIG. 1 indicates a track center line. On the track, the region of a recording unit (denoted by R1) is provided. The region R1 has the size (A1) 103 in the radial direction r and the size (A2) 102 in the circumferential direction c. The magnetic field (denoted by M1) of the recording head has the size (B1) 105 in the major axial direction (radical direction r) and the size (B2) 106 in the minor axial direction (circumferential direction c). As position control of the head, position control in the radial direction r relates to a position shift in the radial direction r of the magnetic field M1.

Note that, the size in the present embodiment will be described targeting on a region of a part where the rotational direction c of the disk and the major axial direction (radial direction r) (size (B1) 105) of the head magnetic field M1 are orthogonal to each other.

Note that, the size (B1) 105 in the major axis of the head magnetic field uses, as a reference, a larger one of a magnetic field of the recording head (magnetic field by a writing element) and a magnetic field of the reproducing head (magnetic field by a reading element). When this larger one (for example, the recording head) is used, performance of a smaller one (for example, the reproducing head) is also satisfied, and thus there is no problem.

In the manufacture of the HDD of the present embodiment, as a reference of the high recording density, the case is assumed that recording of 1 Tbit/inch$^2$ that makes the ratio of the size (A2) 102 and the size (A1) 103 of the region R1 be 1 to 2.5. In this case, the track width size (T1) 104 in the radial direction r becomes, for example, 40 nm. Further, the size (B1) 105 in the major axis direction of the magnetic field M1 becomes, for example, 20 nm. In that case, a specification (accuracy) (denoted by Y) required in the head position control (in the radial direction r) basically becomes ±10 nm (20 nm) by subtracting 20 nm of the size (B1) 105 in the major axis direction of the magnetic field M1 from 40 nm of the track width size (T1) 104 serving as a writing width or a reading width of the head. The position shift up to ±10 nm is allowable.

However, in the case of similarly using the conventional (current) manufacturing method in the head manufacture, since the head is manufactured by a thin film process having about 500 steps, the actually-formed head magnetic field sizes (B1 and B2) have a manufacturing variation, and for example, have a distribution such as a histogram as shown in FIG. 2. In a current working accuracy, a variation of about ±20% occurs in the magnetic field size. For example, when the size (B1) 105 in the major axial direction of the magnetic field M1 is manufactured with taking aim at 20 nm, and as ±20% thereof, the variation (denoted by X) of ±4 nm (8 nm) occurs.

As a result, the specification (accuracy) required by the head position control is modified, and becomes ±6 nm (12 nm) (denoted by Y') (40 nm (T1)−20 nm (B1)−8 nm (X)=12 nm (Y')). Thus far, the specification is same with the premise.

Here, an actually-realized accuracy (denoted by Y") of the head position control is taken as, for example, ±9 nm (18 nm). That is, it is a case that this Y" is lower in the accuracy and larger in the position shift than Y'. Then, in this case, the size (B1) 105 in the major axial direction of the magnetic field M1 which is allowable as the specification (accuracy) is up to 22 nm (40 nm (T1)−18 nm (Y")=22 nm (B1)). A value (boundary) in the histogram corresponding to B1 (22 nm) is indicated by s1. And, a group 109 of a head having a magnetic field size of the size (s1) or more is unusable due to a problem of interference to the adjacent track, thereby decreasing the yield.

That is, as a basic design (combination), it becomes a shape as shown on further left side than s1 of FIG. 2. For the first patterned medium (D1) 101, in the distribution of the magnetic field size "S", while a head of a group 115 (including a group 116 in a vicinity of a reference symbol "s2") having the allowable size (s1) or less can be used, a head of the group 109 having the size (s1) or more can not be used. That is, the first patterned medium (D1) 101 and the head of the group 115 (or the group 116 etc.) correspond to each other, and an HDD including these (first HDD) is manufactured. Note that, a reference (in a vicinity of a center) of the distribution of the magnetic field size S, which corresponds to the first patterned medium (D1) 101, is indicated by "s2" (for example, 20 nm). The group 116 is a group in the vicinity of s2 which does not include a lower-level group.

<1-2: Second Patterned Medium>

Accordingly, in the present embodiment, based on the above-described circumstances, as shown as the second patterned medium (D2) 107, a patterned medium in which the track width (T1) 104 is expanded from the above-described 40 nm to, for example, 42 nm, is made (manufactured or prepared). And, this second patterned medium (D2) 107 is corresponded to the group 109 of the head having a magnetic field which is larger than or equal to the allowable size (B1: 22 nm and s1). That is, an HDD (second HDD) including the second patterned medium (D2) 107 and the head of the group 109 is manufactured. In this manner, in the second HDD, the problem of the interference described above can be solved (as a whole, a yield is slightly improved by an improvement of the usage rate of parts).

However, the above-described design alone makes the recoding density of the second patterned medium (D2) 107 be just, for example, 0.96 Tbit/inch$^2$, and it does not satisfy the production specification described above (1 Tbit/inch$^2$). In the present embodiment, it is an object to satisfy both the high recording density and the improvement of the yield.

<1-3: Third Patterned Medium>

Figure 3:
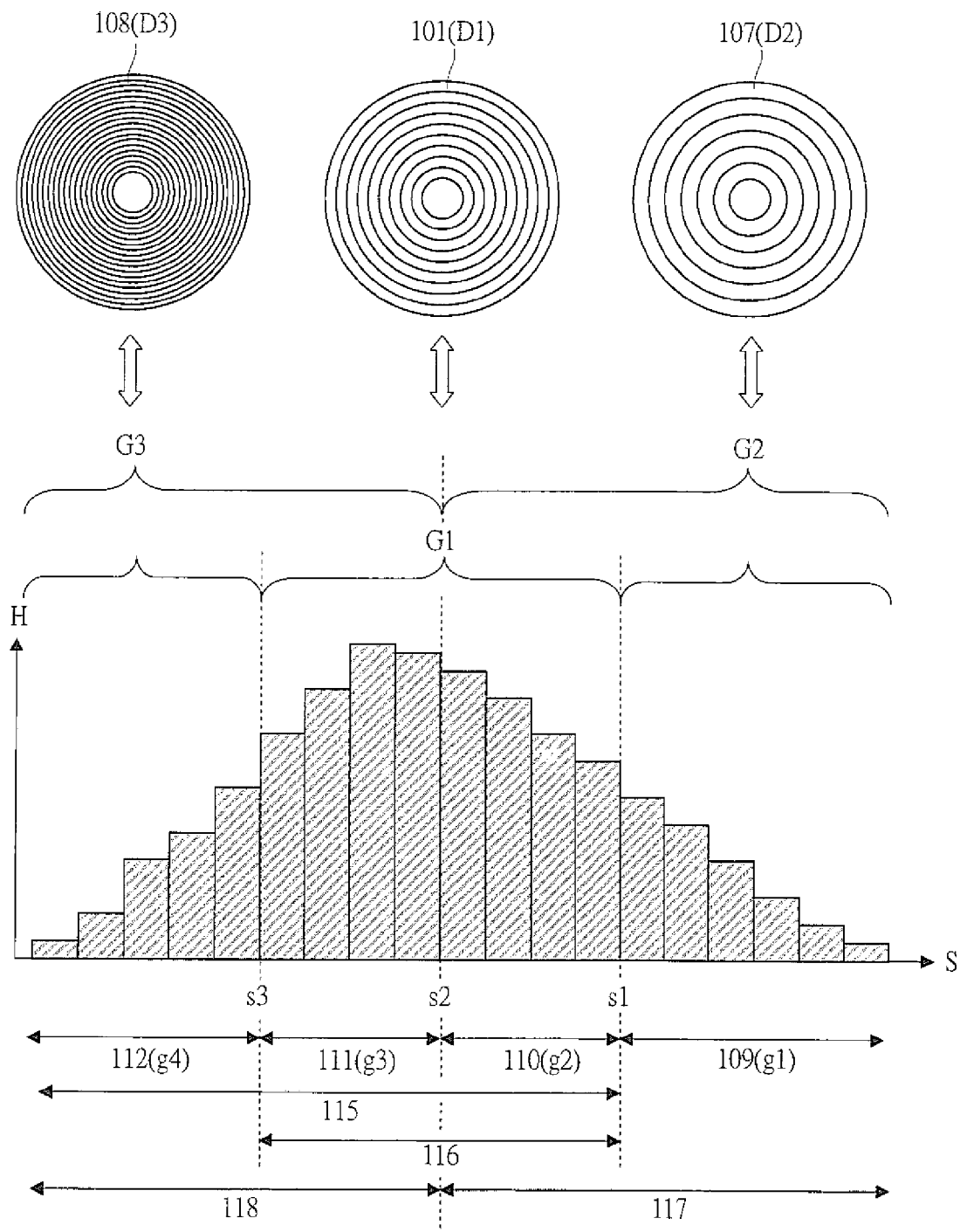
FIG. 3 is a diagram for describing a method of manufacturing an HDD according to a first embodiment of the present invention, and showing a distribution (histogram) of a variation of a magnetic field size in a manufacture of a head, and an example of a correspondence (combination) between a head group and a patterned medium.

Accordingly, in the present embodiment, based on the above-described circumstances, a patterned medium as a third patterned medium (D3) 108 in which the track width (T1) 104 is shrunk from the above-described 40 nm to, for example, 38 nm, is made (manufactured or prepared) as shown in FIG. 3. This third patterned medium (D3) 108 corresponds to a group 118 (a group 111 and 112) of a head having a magnetic field size of, for example, 20 nm (s2 of the reference) or less. That is, an HDD (third HDD) including the third patterned medium (D3) 108 and the head of the group 118, is manufactured. At this time, the recording density of the third patterned medium (D3) 108 becomes, for example, 1.06 Tbit/inch$^2$ exceeding the product specification described above (1 Tbit/inch$^2$).

Note that, "s3" is a boundary value (for example, 18 nm) of a lower side with respect to the reference (s1) of the magnetic field size which corresponds to the first patterned medium (D1). By each boundary (s1, s2, and s3), a whole of the distribution is classified (sectioned) into four groups (the group (g1) 109, group (g2) 110, group (g3) 111, and group (g4) 112).

In the correspondence described above, particularly, the group (g4) 112 only can be first corresponded to the third patterned medium (D3) 108 similarly to the correspondence between the second patterned medium (D2) 107 and the group 109. Further, the group (g3) 111 of s2 or less and s3 or more can be corresponded to the third patterned medium (D3) 108. That is, the group (g3) 111 which is s2 or less and s3 or more is corresponded to both the first patterned medium (D1) 101 and the third patterned medium (D3) 108 in a partially overlapped (redundant) manner. A head belonging to the group (g3) 111 can be used for any of the media (D1 and D3). Similarly, to the second patterned medium (D2) 107 side, not only the group (g1) 109, but also the group (g2) 110 which is s1 or less and s2 or more can be corresponded in combination.

That is, it is summarized that a modified design (combination) becomes a shape as shown in FIG. 3. The first patterned medium (D1) 101 and the group 116 (first group G1) are corresponded to each other (first HDD). Further, the second patterned medium (D2) 107 and the group 117 (second group G2) are corresponded to each other (second HDD). Further, the third patterned medium (D3) 108 and the group 118 (third group G3) are corresponded to each other (third HDD).

In this manner, by the combination of the three types of patterned media (D1 to D3) and four head groups (g1 to g4), a plurality of HDDs having different the correspondences between the patterned medium and the head (the correspondences are totally, for example, six types) are manufactured. FIG. 8A shows the combination described above in a briefly summarized manner.

According to the design as thus far described, a proper effect is obtained in the present embodiment. That is, by the combination described above, the usage rate of head parts is improved and so forth, thereby improving the manufacturing yield as a whole.

<1-4: Combination of Plurality of Patterned Media>

Further, in general, an HDD can be configured with a plurality of disks (a multiple structure). Therefore, for example, one HDD (fourth HDD) using two pieces of the first patterned medium (D1) 101 can be first configured when two disks are mounted on one HDD. And, for example, one HDD (fifth HDD) using the second patterned medium (D2) 107 and the third patterned medium (D3) 108 in combination can be configured.

The fifth HDD satisfies the product specification of 1 Tbit/inch on average as the recording density ($(0.96+1.06)\div 2 \approx 1$ Tbit/inch$^2$) similarly to the fourth HDD. In this manner, a plurality of types of patterned media (D1 to D3) and a plurality of head groups (g1 to g4) are appropriately combined, so that respective HDDs having a same recording density can be configured. In other words, since a flexibility of the design and manufacture of an HDD is high, a manufacturing efficiency thereof can be increased.

FIG. 8B briefly shows an example of the combination in the case where a plurality (P) of patterned media and a plurality (Q) of heads are embedded in a single HDD device similarly to the above described example. In a plurality of HDDs which are manufactured based on the combination like shown in FIG. 3 and FIG. 8A, the following types of HDDs can be selectively configured. The fourth HDD is provided with two pieces of a minimum unit according to a correspondence between the head of the group G1 and the patterned medium D1. The fifth HDD is provided with a minimum unit according to a correspondence between the head unit of the group G2 and the patterned medium D2, and a minimum unit according to a correspondence between the head unit of the group G3 and the patterned medium D3, respectively. The fourth HDD and the fifth HDD are two types of HDDs having different inner structures, and both of them satisfy a predetermined recording capacity.

According to the above-described method, a high recording density (1 Tbit/inch$^2$ on average) and an improvement of the manufacturing yield are realized.

<1-5: Rule of Combination>

In the present embodiment, predetermined rules (conditions) of the combinations are defined as follows.

As shown in the distribution of the head magnetic field size S described above, the group (g1) 109 of the heads having the magnetic field size of 22 nm (s1) or larger, is less than the group (G3) 118 (g3 and g4) having the magnetic field size of 20 nm (s2) or smaller.

Therefore, similarly to the first HDD and the second HDD, a head part belonging to the group (G3) 118 of s2 or less becomes excess when the design is made such that one patterned medium is simply combined into one head group, thereby decreasing the usage rate of parts.

Therefore, in the present embodiment, the distribution by the manufacturing variation of the heads are classified into basic four groups (g1 to g4) such as the group (g1) 109 of s1 or more, the group (g2) 110 of s1 or less and s2 or more, the group (g3) 111 of s2 or less and 18 nm (s3) or more, and the group (g4) 112 of s3 or less according to the respective values (s1 to s3) of the head magnetic fields serving as references. The groups 115 to 118 are combinations of these.

And, as the example of FIG. 3, the group (G1) 116 (g2 and g3) corresponds to the first patterned medium (D1) 101, and the group (G2) 117 (g1 and g2) corresponds to the second patterned medium (D2) 107, and the group (G3) 118 (g3 and g4) corresponds to the third patterned medium (D3) 108.

In this manner, the combination (correspondence) between the head and the patterned medium makes combinations in a partially overlapped manner. The group (g2) 110 and the group (g3) 111 which are the overlapped portions are used for two or more types of patterned media each is characteristically adjacent. The number (M) of pattered media and the number (N) of head groups are in a relation of M<N. According to these rules, the usage rate of head parts is increased, thereby improving the yield as a whole.

In this manner, in the present embodiment, by the classification into a plurality (N: four pieces) of head groups according to the plurality (M: three pieces) of types of patterned media, and the overlapped combinations and the like increase the flexibility of the combination between the head (the distribution of the magnetic field size) and the patterned medium. Combinations can be made without being limited to the examples described above. According to these factors, excess and deficiency of the head supply is solved, so that the usage rate of part can be further improved.

\<HDD Configuration\>

Figure 4A:
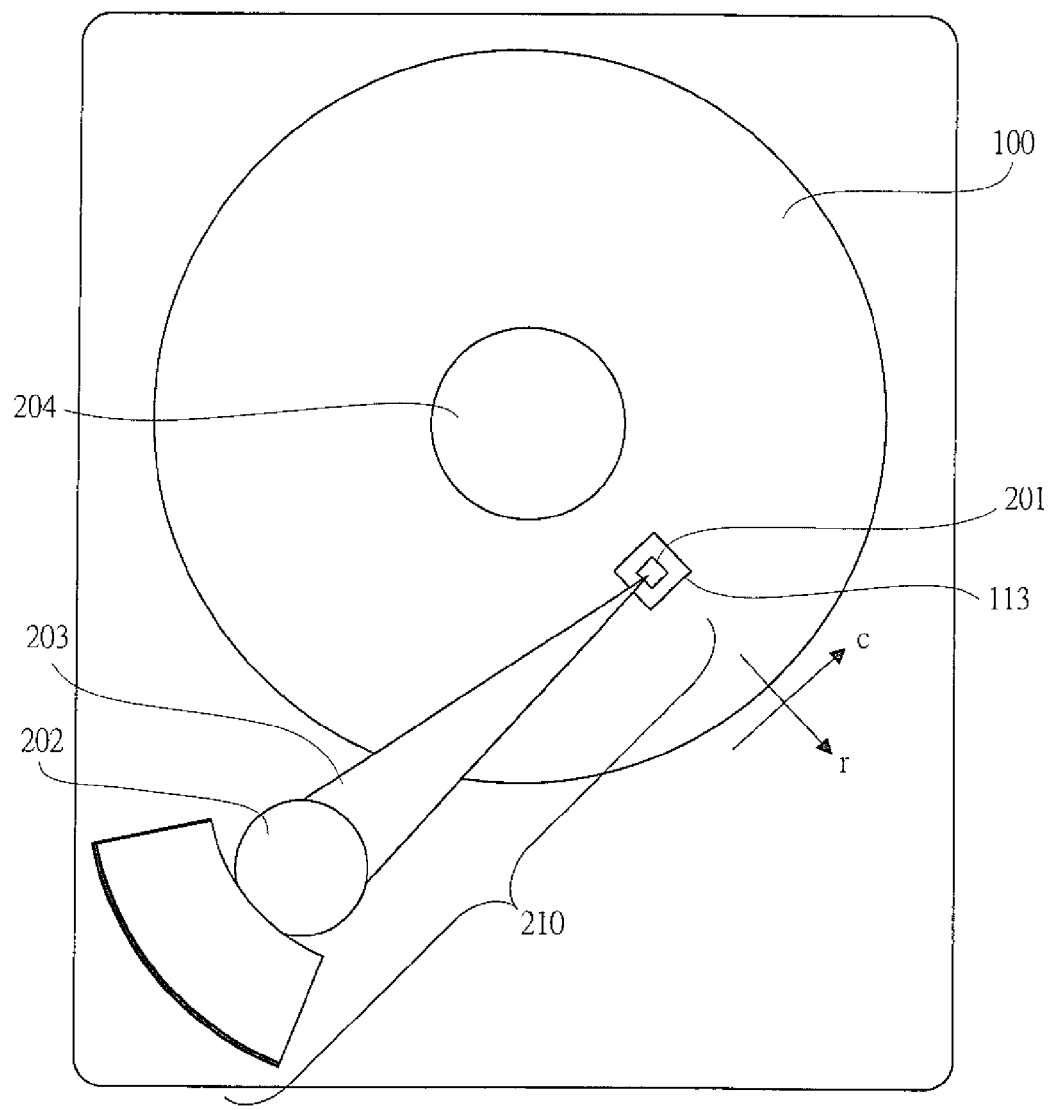
FIG. 4A is a diagram showing a hardware configuration of an HDD in a method of manufacturing an HDD according to an embodiment of the present invention, and showing a schematic configuration of a medium plane surface.
Figure 4B:
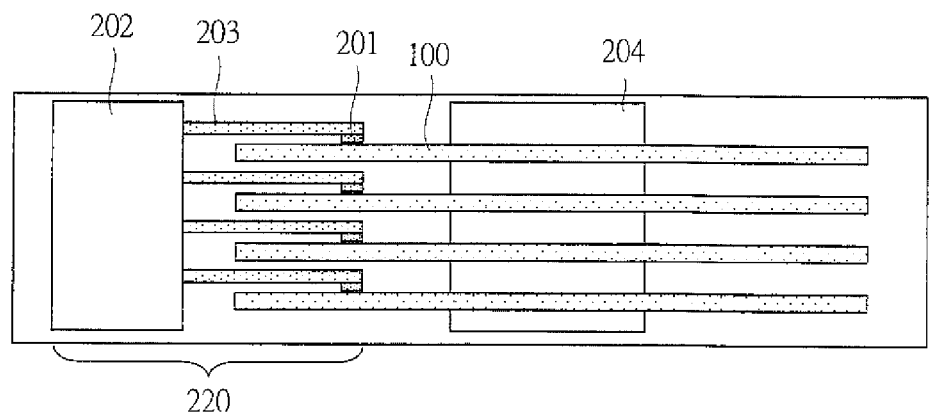
FIG. 4B is a diagram showing a hardware configuration of the HDD in the method of manufacturing an HDD according to the embodiment of the present invention, and showing a schematic configuration in an axial direction.

Next, FIG. 4A and 4B shows a hardware configuration of an HDD according to the manufacturing method of the HDD of the present embodiment. FIG. 4 schematically shows the same configuration as that of a currently common HDD.

In FIG. 4A, the present HDD is configured with a patterned medium 100, a head unit 210, and other parts such as a circuit board and a housing. The head unit 210 is configured by a head 201, an arm 203, a rotary actuator 202, and others. The arm 203 is driven by the rotary actuator 202. The head 201 is installed to a tip of the arm 203. The patterned medium 100 is installed to a spindle 204. Although the head 201 is very small in practice, it is shown by a square to be easily recognized.

The head 201 has a constant slope in the radial direction r of the patterned medium 100. As a result, the magnetic field size of the head 201 in the rotational direction c of the patterned medium 100 is changed following the cosine rule relative to the slope of the major axis (B1 described above) of the magnetic field size against the radial direction r. Therefore, the track width (T1 described above) in the patterned medium 100 changes against the radius of the medium.

Note that, in the present embodiment, the tip portion of the arm 203 (head unit 210) is referred to as a head (sometimes referred to as a slider and the like). Further, for one disk (patterned medium 100), a portion serving as one unit configured by the head 201, the arm 203, the rotary actuator 202, and the like, is referred to as the head unit 210. The combination of one head unit 210 and one disk (the patterned medium 100) serves as a minimum unit in the HDD configuration.

Further, as shown in FIG. 4B, it is possible to set up a configuration (multiple structure) in which a plurality of minimum units (210 and 100) as described above are provided in an axial direction. A group of the plurality of head units 210 are referred to as, for example, a head module 220. In the case of the HDD having the multiple structure, as described above (FIG. 8), it is possible to combine the minimum units (the head and the patterned medium) which have different characteristics in the present embodiment.

\<Manufacturing Method\>

Figure 5:
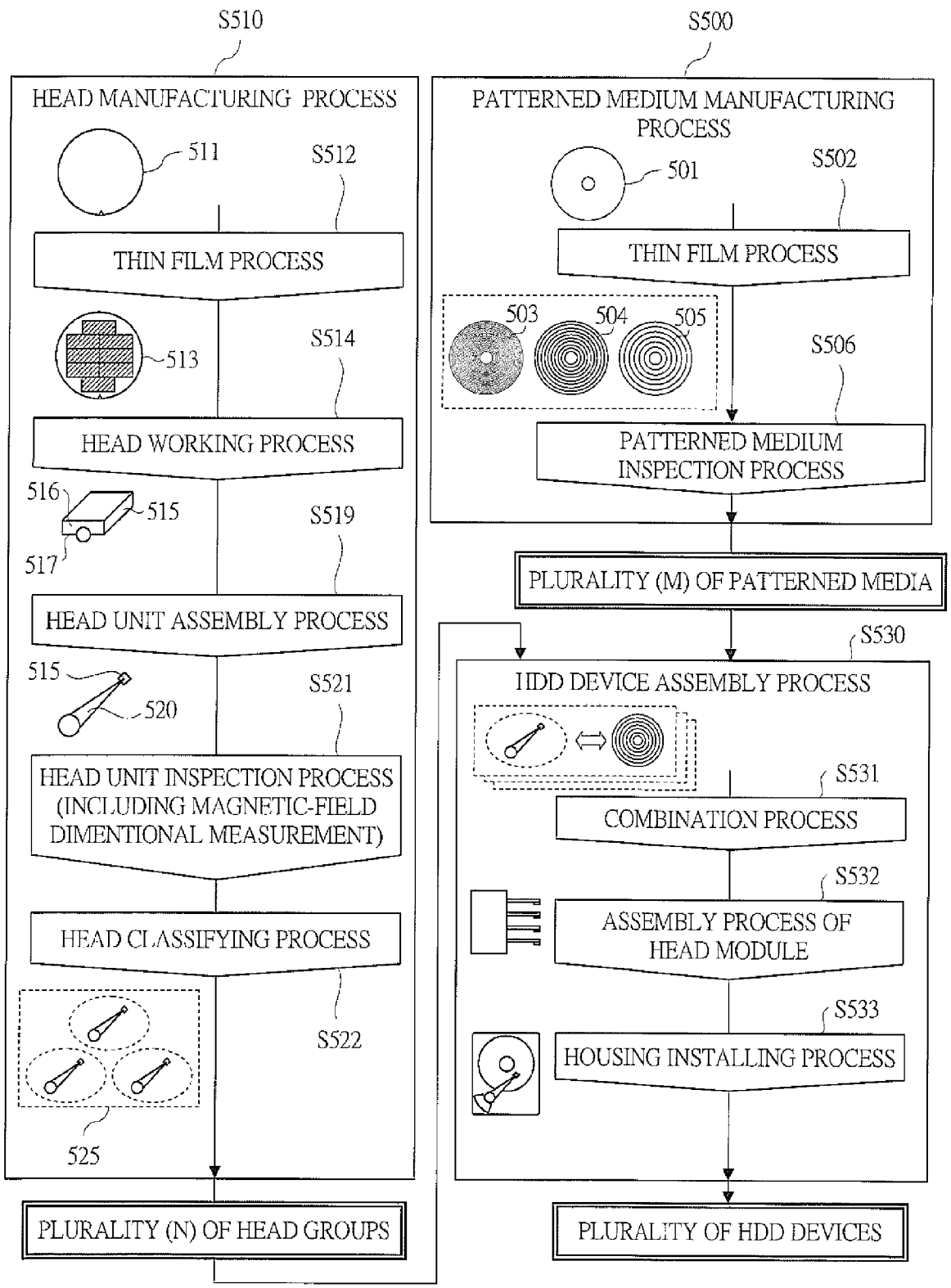
FIG. 5 is a diagram showing a schematic flow of a manufacturing process in a method of manufacturing an HDD according to an embodiment of the present invention.

Next, in FIG. 5, a schematic flow of a manufacturing process according to the HDD manufacturing method of the present embodiment is shown. The present manufacturing process of the HDD includes a patterned medium manufacturing process S500, a head manufacturing process S510, and an HDD device assembly process S530 by a major classification.

In the patterned medium manufacturing process S500, a thin film process S502 includes a step of forming a basic medium 501 made of glass or a metal compound prior to a pattern formation, and a step of forming the pattern on the medium 501. In the step of pattern formation, by using the thin film process including deposition, exposure, development, etching, and others, a patterned medium in which a track width, an interval (or a dot arrangement), and the like are different is formed. Note that, in place of the exposure process, a nanoimprint process may be used. In this manner, the patterned media 503 to 505 (for example, D1 to D3 described above) of various types are formed according to the design of the head side. In a patterned medium inspection process S506, these patterned media 503 to 505 are inspected if there are problems about size, defect, and others. By the inspection, defective products are removed. By the processes described above, a plurality (M) of types of the patterned media (for example, D1 to D3) are manufactured (prepared).

In the head manufacturing process S510, a part 513 to serve as a base of the head formation is formed on a wafer 511 by deposition, exposure, development, etching, and others in a thin film process S512. After that, in a head machining process S514, a head 515 (the head 201 described above) is worked and formed from the part 513 by cutting, grinding, polishing, and others. For example, on one head 515, a writing element 516 and a reading element 517 are formed (to serve as a recording and reproducing head). The writing element 516 and the reading element 517 are positioned at an end portion of the head 515.

In a head unit assembly process S519, the head 515 (head 201) which is formed in S514, an arm 520 (arm 203), an actuator (rotary actuator 202), and the like are combined to assemble one unit (head unit 210). The head 515 is installed to a tip of the arm 520.

A head unit inspection process S521 includes a process of measuring magnetic field sizes (a recording magnetic field size and a reading magnetic field size) of the head 515 (head 201) of the head unit 210. At this time, a measurement of a size and a shape, and an inspection of defects and the like of each element of the head 515 are performed. In the head unit inspection process S521, magnetic field sizes of each head are measured individually. The measuring method at this time includes a method of actually recording a magnetic pattern on a magnetic film and reading the same, a method of estimating from a result of an appearance check such as SEM, and others.

In a head classifying process S522, based on results (head magnetic field sizes) of the measurement and the inspection in S521, the head 515 (head unit 210) is classified into a plurality of groups 525 according to the above-described concept. For example, in the rule according to the first embodiment, either the magnetic field size of the recording head or the magnetic field size of the reproducing head (for example, the magnetic field size of the recording head) is classified into four groups (g1 to g4) according to the boundary values s1 to s3 as shown in FIG. 3. By the processes described above, the plurality (N) of head groups (g1 to g4) is manufactured (prepared).

In an HDD device assembly process S530, the HDD device is assembled by using the plurality (M) of types of the patterned media which are manufactured in the patterned medium manufacturing process S500 and the plurality (N) of types of the head groups which are manufactured in the head manufacturing process S510. In a combination process (a correspondence process), combination (correspondence) and confirmation of these patterned media and heads are performed following the predetermined rule. For example, as shown in FIG. 3, the media (D1 to D3) correspond to the heads (g1 to g4) as D1-G1, D2-G2, and D3-G3, respectively. In this manner, the basic minimum unit (the head unit 210 and the patterned medium 100) is configured, and thus the HDD including that can be configured.

Further, in the case of the multiple structure described above, by using the minimum unit and following the predetermined rule, a head module 220 (and the plurality of patterned media 100) is assembled in a head module assembly process S532. For example, a combination and the like to obtain each recording density of the media being same in an HDD having two patterned media as the fourth and the fifth HDDs. The assembled head module 220 is combined with the patterned media (D1 to D2) and the like which are designed based on the same rule.

In a housing installing process S533, a part made of the head unit 210 or the head module 220 and the patterned medium 100 is installed with other parts on a housing of the HDD device, thereby completing the HDD device. By the processes described above, a plurality of HDD devices, in which the predetermined specifications according to types of the used patterned media 100 are satisfied is manufactured.

Note that, it is possible to change details of each process such as measurement, classification, and combination of the magnetic field size and a sequence thereof in some degree. For example, after the head working process S514 and before assembling the head unit 210, it is of course possible to perform the measurement of the magnetic field size of the head 201 and others.

As described above, according to the present embodiment, the HDD of the high recording density can be manufactured with a high yield and an increased (improvement or significant increase) usage rate of parts such as the head 201. Further, particularly, compared to a case that the present embodiment is not used (a case that a manufacturing method similar to a conventional one is used), position control and a working accuracy (specification) of the head can be significantly relaxed, thereby realizing a reduction of manufacturing cost.

Second Embodiment

Next, with reference to FIG. 6, a method of manufacturing an HDD according to a second embodiment of the present invention will be described. The second embodiment is, as a different characteristic from the first embodiment, a case using a patterned medium having a track formed by not the trench-like but a dot-shaped pattern. Hereinafter, the different characteristic will be described.

Figure 6:
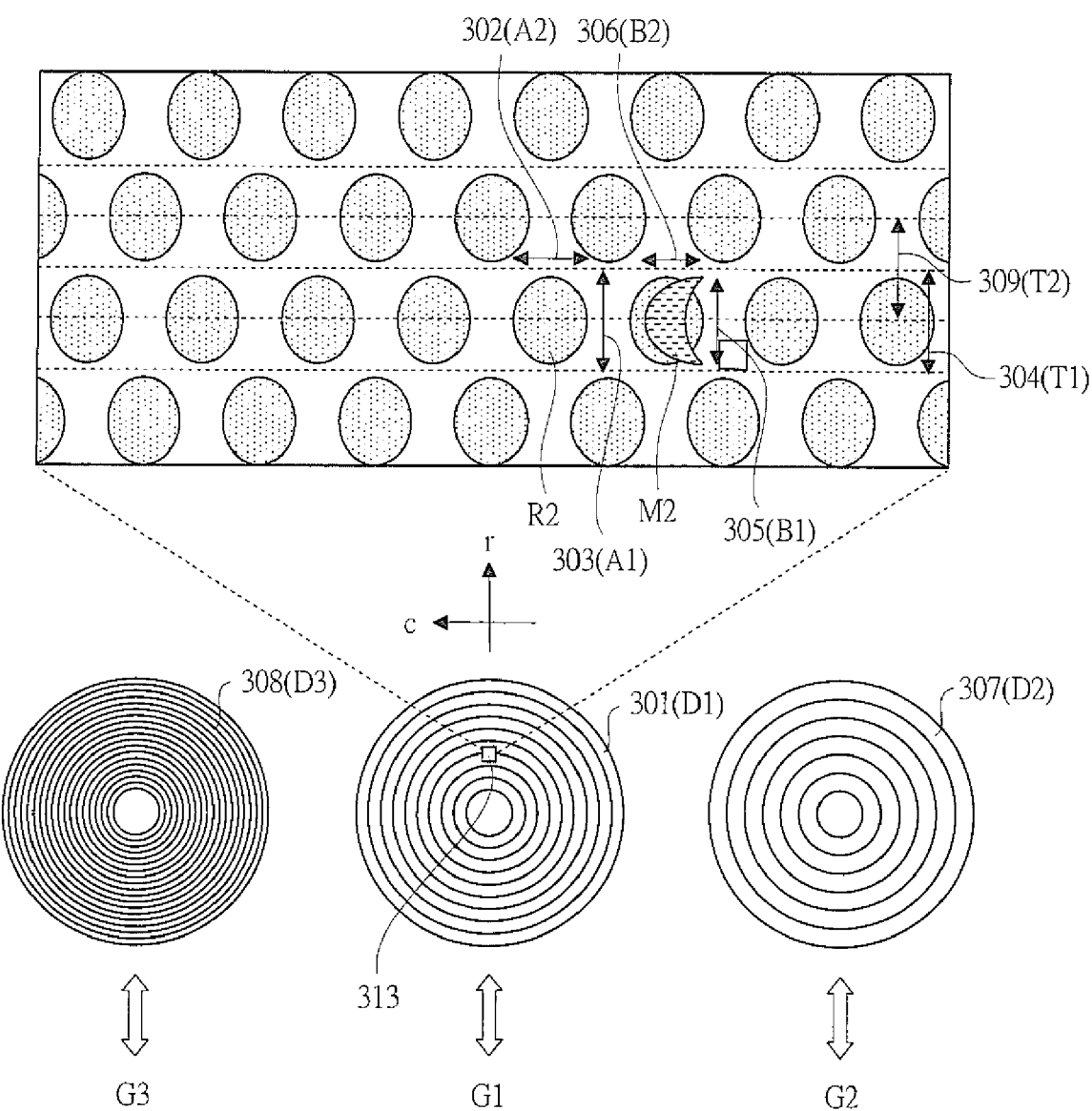
FIG. 6 shows a plurality of patterned media, an enlargement of a part of a patterned medium (in a case of a dot-like pattern), and a combination example in a method of manufacturing an HDD according to a second embodiment of the present invention.

In FIG. 6, a partial enlargement of the dot-like patterned medium is shown. Note that, in the enlargement, a curve of the track is omitted to show the track linearly. In an example of FIG. 6, regarding an enlargement of a part 313 of a first patterned medium (D1) 301 serving as a reference, a track has a track width size (T1) 304 and a track interval size (T2) 309 in a radial direction r. Note that, a broken line indicates a track center line and a boundary line. On the track, a region (denoted by R2) of a recording unit is provided being dot-like with an equal interval. In an adjacent track, the dot arrangement is shifted. The dot region R2 has a size (A1) 303 in the radial direction r and a size (A2) 302 in a circumferential direction c. A magnetic field (denoted by M2) of a recording head has a size (B1) 305 in a major axis direction (radial direction r) and a size (B2) 306 in a minor axis direction (circumferential direction c).

Note that, in the size (B1) 105 of the major axis of the head magnetic field M2, a larger one among a magnetic field of a recording head (magnetic field by a writing element) and a magnetic field of a reproducing head (magnetic field by a reading element), is used as a reference. When this larger one (for example, the recording head) is used, performance of the smaller one (for example, the reproducing head) is also satisfied, and thus there is no problem.

As shown in FIG. 6 in a simple manner, following the same concept with the first embodiment and the predetermined rule, combinations of the patterned media and the head groups are configured. For example, media (D1 to D3) correspond to heads (g1 to g4) as D1-G1, D2-G2, and D3-G3, respectively.

In the case of the dot-like pattern, numerical values and the like which are different from the case of the trench-like pattern are as follows. When a recording of 1 Tbit/inch$^2$ in which a ratio of A1 and A2 becomes 1 to 1.2 is performed, the track width size T1 in the radial direction r is 28 nm. A specification (an accuracy) required in the head position control becomes ±6 nm (12 nm) by subtracting 16 nm of the size B1 in the major axial direction of the head magnetic field from the track width size T1=28 nm serving as a writing width or a reading width of the magnetic head. However, the magnetic field size of the head has a distribution as shown in FIG. 2 described above due to a manufacturing variation. In a conventional working accuracy, a variation of about ±25% occurs. When the manufacture is done with a target head magnetic field size B1 set at 16 nm, a variation of ±4 nm occurs. As a result, the accuracy required by the head position control becomes ±4 nm by correction.

Here, when the accuracy of the actual head position control is set to ±5 nm, an allowable head magnetic field size B1 is up to 18 nm, and a head group (g1) having the magnetic field size larger than that causes a defect such as interference and the like to the adjacent track. So, a second patterned medium (D2) 307 in which the track width is extended to 30 nm is formed, and is combined with the head group (g1) having the magnetic field size of 18 nm or larger. In this manner, a problem of the interference to the adjacent track is solved. However, a recoding density of the second patterned medium (D2) 307 is 0.93 Tbit/inch$^2$, and it does not satisfy the product specification.

Accordingly, a patterned medium 308 having a track width of 26 nm is formed, and is combined with head groups 311 and 312 having the magnetic field size of 16 nm or smaller. At this time, a recording density of the patterned medium 308 becomes 1.07 Tbit/inch$^2$.

Then, by combining the second patterned medium (D2) 307 and the third patterned medium (D3) 308, an HDD is configured. This HDD, similarly to the case of the HDD using two pieces of the first patterned medium (D1) 301, satisfies the product specification of 1 Tbit/inch$^2$ on average. By the foregoing method, the manufacturing yield is improved.

Further, the heads are classified into four groups such as 18 nm or more for g1, 16 nm or more and 18 nm or less for g2, 14 nm or more and 16 nm or less for g3, and 14 nm or less for g4. These groups are combined as D1-G1, D2-G2, and D3-G3. Two patterned media are combined so as to correspond to each one group (g2 and g3), so that the usage rate of the head parts is increased.

As described above, according to the present embodiment, even in the case of the dot-like pattern, the HDD having the high recording density can be similarly manufactured with a high yield. Not only the trench-like and the dot-like patterns, but also other patterns can be similarly applied.

Third Embodiment

Next, with reference to FIG. 7, a method of manufacturing an HDD according to a third embodiment of the present invention will be described. The third embodiment is, similarly to the second embodiment, a case that a patterned medium having a track by a dot-like pattern is used. A different characteristic is a configuration in which a track width is not changed with a plurality of types of media, but a pattern interval size in a circumferential direction c is changed, thereby changing and adjusting a recording density.

In FIG. 7A, an enlargement of a part 401 (pattern) of the dot-like patterned medium in the first example is shown. In FIG. 7B, an enlargement of a part 402 (pattern) of the dot-like patterned medium in the second example is shown.

In the dot-like pattered medium (D1) 301 of the second embodiment, as described above, when the recording of 1 Tbit/inch$^2$ is performed, the accuracy required by the head position control becomes ±4 nm. When an accuracy of an actual head position control is ±5 nm, an allowable head magnetic field size B1 is up to 18 nm, and a head group g1 having the magnetic field size larger than that causes a defect of interference and the like to an adjacent track. Hence, the patterned medium shown in a second patterned medium (D2) 307 in which the track width is extended to 30 nm, is formed, and is combined with the head group g1 having the magnetic field size of 18 nm or larger. However, the recording density of the second patterned medium (D2) 307 is 0.93 Tbit/inch$^2$, and it does not satisfy the product specification.

Accordingly, in the third embodiment, a pattern as the part 401 of FIG. 7A is applied in the second patterned medium (D2), and a pattern as the part 402 of FIG. 7B is applied in the third patterned medium (D3). As the part 401 of FIG. 7A, pattern interval size (p1) in the circumference direction c is set to 23 nm. On the other hand, as the part 402 of FIG. 7B, a patterned medium (D3) is formed in which a pattern interval size (p2) in the circumferential direction c is changed from p1=23 nm to p2=21 nm. By forming such patterned media (D1 to D3), the specification of 1 Tbit/inch$^2$ is satisfied, and also the accuracy (specification) of the head position control is satisfied.

Note that, in each of the embodiments, the flow of the manufacturing method as FIG. 5 can be applied.

In the foregoing, the invention made by the inventor of the present invention has been concretely described based on the embodiments. However, it is needless to say that the present invention is not limited to the foregoing embodiments and various modifications and alterations can be made within the scope of the present invention.

The present invention can be used for a device such as an HDD device using a patterned medium in which a pattern is formed on a disk-like medium and an information record is performed by using a physical state change of, for example, electron, magnetism, light, spin, or the like.

What is claimed is:

1. A method of manufacturing a hard disk recording device using a patterned medium,
    the hard disk recording device including the patterned medium which is a disk formed with a pattern serving as a recording unit, and a head for performing recording and reproducing of information to the patterned medium,
    the method comprising:
    a first process of manufacturing the patterned medium;
    a second process of manufacturing the head; and
    a third process of assembling the hard disk recording device including the patterned medium of the first process and the head of the second process, wherein
    the first process includes a step of forming a plurality (M) of types of patterned media which are designed according to a specification of the head and have different densities of formation of the pattern serving as the recording unit,
    the second process includes a step of working and forming the head, a step of measuring a magnetic field size of the head, and a step of classifying the head into a plurality (N) of groups according to a distribution of a variation of the magnetic field size of the head,
    the third process combines the plurality (M) of types of patterned media and the plurality (N) of groups following a predetermined rule so as to assemble a plurality of hard disk recording devices in which correspondences between the patterned media and the heads are different, and
    the number (N) of groups of the head is larger than the number (M) of types of the patterned media (M<N).

2. The method of manufacturing the hard disk recording device using the patterned medium according to claim 1, wherein,
    as the predetermined rule, at least one partial group among the plurality (N) of groups is corresponded to two or more types of the patterned media among the plurality (M) of types of the patterned media to be redundantly used.

3. The method of manufacturing the hard disk recording device using the patterned medium according to claim 2, wherein,
    in the combination, one type of the patterned medium is corresponded to two or more groups which have close characteristics, and one group is corresponded to two or more types of the patterned media which have close characteristics.

4. The method of manufacturing the hard disk recording device using the patterned medium according to claim 1, wherein
    the patterned medium which is manufactured by the first process has a track by a pattern in which trenches are concentrically arranged.

5. The method of manufacturing the hard disk recording device using the patterned medium according to claim 1, wherein
    the patterned medium manufactured by the first process has a track by a pattern in which dots are concentrically arranged.

6. The method of manufacturing the hard disk recording device using the patterned medium according to claim 1, wherein
    the head has a writing element and a reading element on a single head,
    the second process measures a size in a radial direction of the patterned medium in a recording magnetic field by the writing element and a reproducing magnetic field by the reading element of the head,
    the first process includes manufacture of the patterned medium having a track width or a track interval which are designed by adjusting for a larger size of a size of the recording magnetic field and a size of the reproducing magnetic field which are measured by the second process, and
    the third process corresponds the first patterned medium to two or more groups.

7. The method of manufacturing the hard disk recording device using the patterned medium according to claim 6, wherein,
    in the first process, the patterned medium has the track width or the track interval designed by an accuracy of position control of the head, and the size of the recording magnetic field or the size of the reproducing magnetic field of the head in a radial direction, and
    the first process includes a step of forming the plurality (M) of types of patterned media in which the track widths or the track intervals and the recording densities are different.

8. The method of manufacturing the hard disk recording device using the patterned medium according to claim 7, wherein
    the patterned medium has a track by a pattern in which dots are concentrically arranged,
    in the first process, the patterned medium has a pattern interval size in a circumferential direction designed so as to obtain a prescribed recording capacity, and
    the first process includes a process of forming the plurality (M) of types of the patterned media in which the pattern interval size and the recording density.

9. The method of manufacturing the hard disk recording device using the patterned medium according to claim 1, wherein
the hard disk recording device has a plurality (P) of the patterned media and a plurality (Q) of the heads inside of a single device,
the first process includes a step of forming the plurality (M) of types of patterned media in which characteristics including the recording density are different, and,
in the third process, a plurality of types of the hard disk recording devices having the plurality (P) of patterned media and the plurality (Q) of heads are assembled by combinations of the plurality (M) of types of the patterned media and the plurality (N) of groups so as to obtain a prescribed recording capacity as the single device.

* * * * *